United States Patent
Meier (10) Patent No.: US 6,662,541 B2
(45) Date of Patent: Dec. 16, 2003

(54) SQUARE DRIVE AND PINE STRAW RAKE APPARATUS AND SYSTEM

(76) Inventor: James L. Meier, 100 Aqua Rd., Madison, GA (US) 30650

(*) Notice: Subject to any disclaimer, the term of this patent is extended or adjusted under 35 U.S.C. 154(b) by 124 days.

(21) Appl. No.: 09/949,141

(22) Filed: Sep. 7, 2001

(65) Prior Publication Data

US 2003/0046917 A1 Mar. 13, 2003

(51) Int. Cl.[7] .............................................. A01D 78/00
(52) U.S. Cl. ............................................ 56/366; 56/376
(58) Field of Search .............................. 56/12.4, 12.5, 56/13.5, 14.3, 14.4, 219, 220, 221, 222, 224, 226, 227, 376, 377, 378, 379, 380, 384, 375, 365, 366, 367, 370

(56) References Cited

U.S. PATENT DOCUMENTS

| | | | | |
|---|---|---|---|---|
| 2,041,182 A | * | 5/1936 | Hume et al. | ................... 56/226 |
| 2,162,506 A | * | 6/1939 | Jones et al. | ................... 56/377 |
| 2,317,127 A | * | 4/1943 | Bowling | ................... 56/219 |
| 2,454,063 A | * | 11/1948 | Irvine | ................... 56/219 |
| 2,509,430 A | | 5/1950 | Guy | |
| 2,545,723 A | * | 3/1951 | Conner | ................... 280/483 |
| 2,595,788 A | * | 5/1952 | Hill | ................... 56/377 |
| 2,724,942 A | * | 11/1955 | Smith | ................... 56/219 |
| 2,736,206 A | * | 2/1956 | Conner | ................... 474/134 |
| 2,738,640 A | * | 3/1956 | Schroeppel | ................... 56/377 |
| 2,924,061 A | | 2/1960 | Kowalik | |
| 2,929,187 A | | 3/1960 | Boggio | |
| 2,991,613 A | | 7/1961 | Breed | |
| 3,217,473 A | * | 11/1965 | Lawrie | ................... 56/14.4 |
| 3,321,865 A | | 5/1967 | Morkoski | |
| 3,638,408 A | * | 2/1972 | Swanson | ................... 56/219 |
| 3,762,140 A | | 10/1973 | Block | |
| 3,849,974 A | * | 11/1974 | James | ................... 56/226 |
| 3,902,305 A | | 9/1975 | Gibson et al. | |
| 4,077,189 A | | 3/1978 | Hering | |
| 4,166,353 A | | 9/1979 | Garrison et al. | |
| 4,172,356 A | | 10/1979 | Cole | |
| 4,303,373 A | * | 12/1981 | Polhemus | ................... 415/206 |
| 4,353,201 A | * | 10/1982 | Pierce et al. | ................... 56/130 |
| D299,721 S | | 2/1989 | Webster et al. | |
| 4,945,996 A | | 8/1990 | Codding | |
| 5,459,987 A | | 10/1995 | Hining et al. | |
| 6,453,655 B2 | * | 9/2002 | Ferraris | ................... 56/220 |

FOREIGN PATENT DOCUMENTS

| | | | |
|---|---|---|---|
| EP | 0471961 A1 | * | 7/1991 |
| FR | 1513205 | * | 1/1968 |
| GB | 6504 | * | 3/1901 |

* cited by examiner

Primary Examiner—Robert E. Pezzuto
Assistant Examiner—Nathan Mammen
(74) Attorney, Agent, or Firm—Hinkle & O'Bradovich, LLC

(57) ABSTRACT

A pine straw rake apparatus and system, and a square drive for the pine straw rake. Typically, the square drive includes three sprockets, one larger than the other two in a triangular and planar arrangement, and a roller chain wrapped around the partial circumferences of the sprockets. A motor is typically connected to the large sprocket. An embodiment of the pine straw rake includes two square drives in an offset and parallel arrangement with a plurality of rake bars connected to corresponding points on the roller chain of each square drive. The rake bars include rake teeth. In the pine straw rake system, a pine straw rake is connected to a carrier that can be self-propelled or can be adapted to be pulled by a tractor or other vehicle. An elevation adjustment can be used to adjust the elevation of the raking action to compensate for uneven ground or other terrain.

15 Claims, 6 Drawing Sheets

Fig_6

Fig_1C

Fig. 5

SQUARE DRIVE AND PINE STRAW RAKE APPARATUS AND SYSTEM

BACKGROUND OF THE INVENTION

I. Field of the Invention

The present invention relates generally to the field of raking pine straw, and more particularly to a pine straw rake apparatus and system, and to a square drive for the pine straw rake apparatus and system.

II. Description of the Related Art

Figures 1A, 1B:
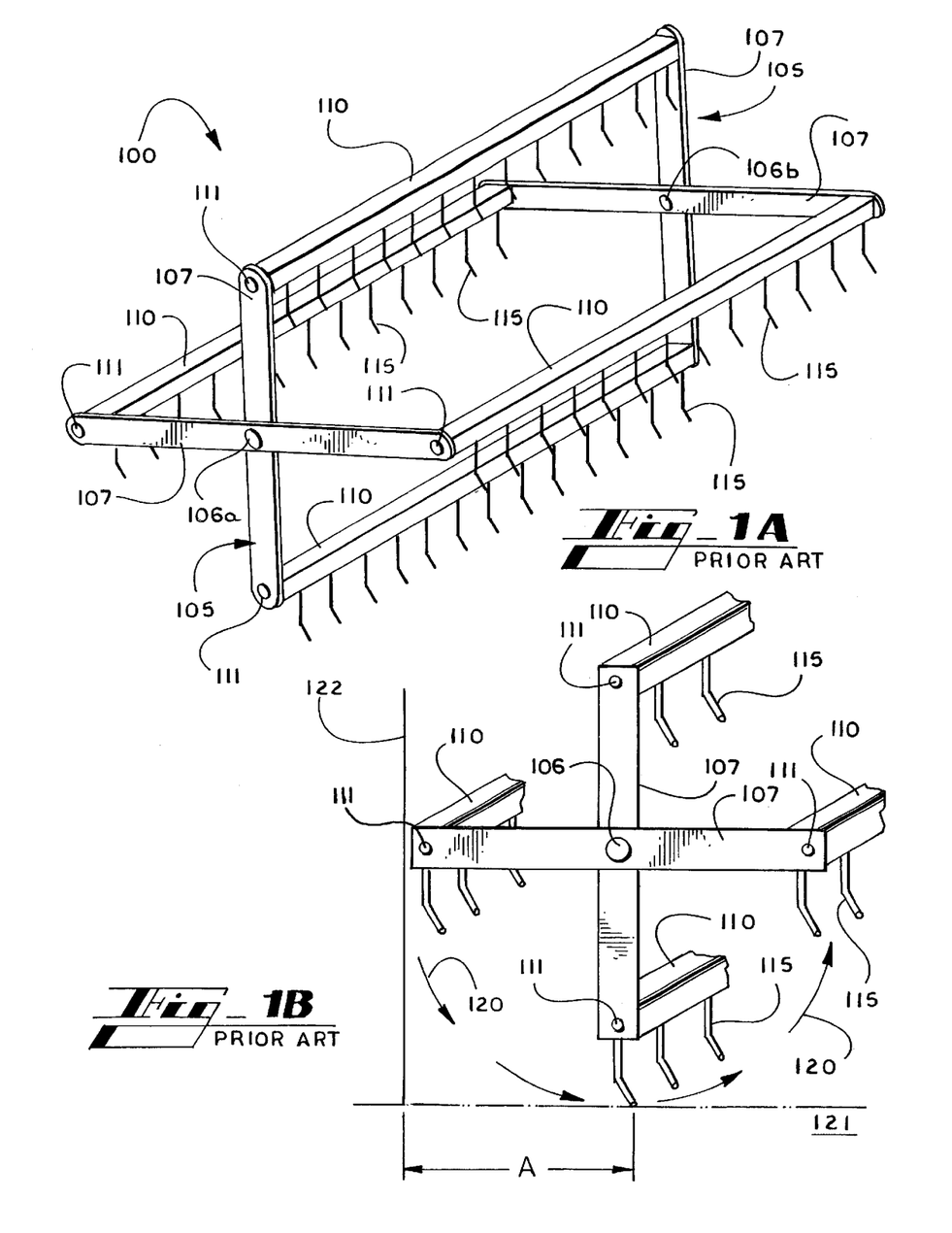
FIG. 1A illustrates a perspective view of a prior art hay rake.
FIG. 1B illustrates a close up view of one of the circular drives of FIG. 1A.

Hay rakes are well known. When hay from hay fields is cut, hay rakes are used to rake hay into rows that are subsequently baled into bales by hay balers. FIG. 1A illustrates a perspective view of a prior art hay rake 100. The rake 100 is normally mounted on a primary mover such as a tractor or trailer for a tractor.

The rake typically includes two circular drives 105, comprised of two cross bars 107. Each circular drive also includes a rotational point 106a, 106b. Rake bars 110 are connected to each circular drive 105 at corresponding points of connection 111. Each rake bar 110 includes several teeth 115 for raking hay. During operation the circular drives 105 rotate about their respective points of rotation 106a, 106b. Each of the circular drives 105 have their own longitudinal axes. The longitudinal axes run parallel to each other. Another way of describing the orientation is that the respective planes in which the two circular drives 105 rotate are parallel and offset.

As the circular drives 105 rotate, each of the respective rake bars 110 move along with their points of connection 111 on the drives 105. The teeth 115 of each bar 110 contact the ground each time the drive bars 107 point up and down. FIG. 1B illustrates a close up view of one of the circular drives 105. FIG. 1B illustrates that in the prior art hay rake 100, each of the rake bars 110 rotate in a circle and overlap the other bars. Arrows 120 illustrate the direction of rotation. At one instant, the teeth 115 of a given rake bar 110 are in contact with the ground 121. At an instant later, the teeth 115 are picked up from the ground 121 as the circular drives 105 rotate in the direction of the arrows 120. It can be seen that the rotation is purely circular and that the overlapping of the bars 110 is substantially elliptical. If the prior art rake 100 is used near an obstruction such as a tree or fence 122, the closest point of contact that the rake 100 can make with the ground is at a distance A, which is typically larger than half the length of the cross bars 107. This minimum distance is necessary to avoid a collision between the outer edges of the circular drives 105 and the obstacle 122.

Figure 1C:
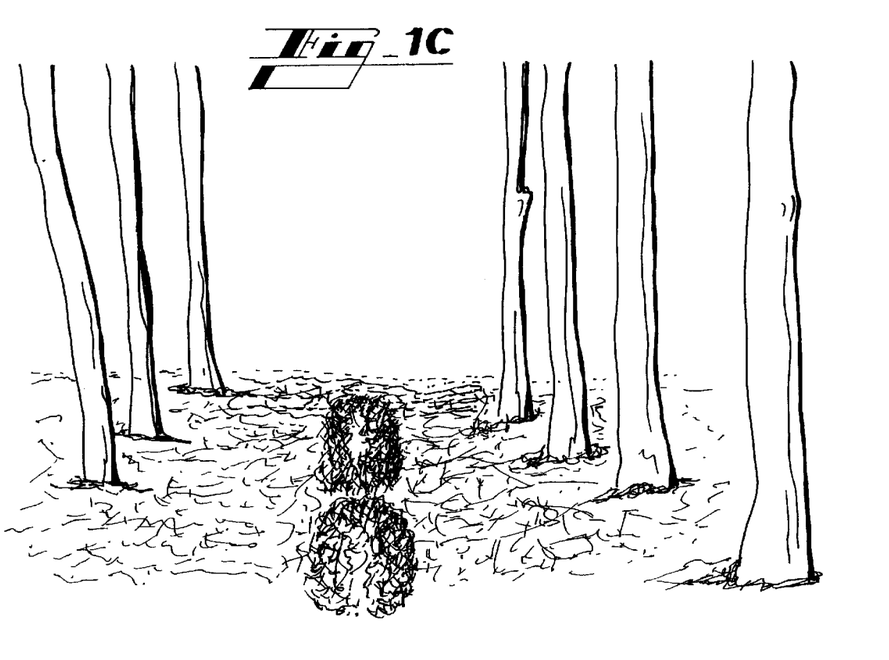
FIG. 1C illustrates a row of pine trees with a prior art hay rake gathering the pine straw.

Pine straw is typically used as top covering for landscaping. Pine straw is typically harvested by growing rows of suitable pine trees. The pine needles fall from the trees and dry out to become suitable pine straw. The pine straw typically falls all around the trees from the base of the tree and outward. Typically small hay rakes, such as rake 100, are used to gather the straw into rows that are subsequently gathered by small hay balers into small bales. In this case, the obstacle 122 is a pine tree. The circular motion of the hay rakes result in one point of contact with the ground such as described above, and this is the only time in which the teeth 115 contact the ground to rake the straw. Therefore a large is distance, A, typically 11–12 inches and higher from the base of the tree is not raked. The rake 100 can not be any closer to the tree than about half the length of the cross bars 107 or else it will hit the tree. This circular motion results in missed pine straw at and near the base of the tree. FIG. 1C illustrates a row of trees used for pine straw and a prior art hay rake having missed much of the pine straw. Therefore, workers with hand rakes have to manually rake the remaining pine straw from the base of the trees, requiring another pass of the hay baler. Hay balers and the circular drive of hay rakes are not ideally suited for pine straw raking.

SUMMARY OF THE INVENTION

In accordance with the present invention and the contemplated problems which have and continue to exist in this field, the invention features, pine straw rake apparatus and system and a square drive for use in the pine straw rake apparatus and system. The pine straw rake is adapted specially to efficiently rake up pine straw from the base of trees and outward.

In general in one aspect, the invention features a drive, including a first sprocket, a second sprocket, a third sprocket in a geometric and planar arrangement with the first and second sprockets and a roller chain wrapped around the partial circumferences of the sprockets.

In one implementation, the drive further includes a motor connected to the first sprocket.

In another implementation, the geometric arrangement is triangular.

In another implementation, the drive further includes a fourth sprocket in geometric and planar arrangement with the first, second and third sprockets and the geometric arrangement is square.

In another implementation the second and third sprockets have substantially the same diameter and the first sprocket has a diameter greater than the diameters of the second and third sprockets.

In another aspect, the invention features a pine straw rake, including two square drives in an offset and substantially parallel orientation with respect to each other, the square drives including a first sprocket, a second sprocket, a third sprocket in a geometric and planar arrangement with the first and second sprockets and a roller chain wrapped around the partial circumferences of the sprockets, a plurality of rake bars connected to respective points on each of the roller chains and a plurality of rake teeth connected to each of the rake bars.

In one implementation, the pine straw rake includes chain mounts connected to the roller chains and rotatably connected to respective ends of the rake bars and the rake bars are connected to the square drives at an angle.

In another implementation, the rake bars are adapted to overlap each other while in motion.

In another implementation, the square drives are adapted to direct the rake teeth in a motion toward the ground and in a motion along the ground during a cycle of movement of the square drive.

In still another aspect, the invention features a pine straw rake system, including a carrier having wheels, a pine straw rake connected to the carrier, the pine straw rake including two square drives in an offset and substantially parallel orientation with respect to each other, the square drives including a first sprocket; a second sprocket, a third sprocket in a geometric and planar arrangement with the first and second sprockets and a roller chain wrapped around the partial circumferences of the sprockets, a plurality of rake bars connected to respective points on each of the roller chains and a plurality of rake teeth connected to each of the rake bars.

In one implementation, the carrier is self-propelled.

In another implementation, the carrier is a trailer adapted to be pulled by a primary mover such as a tractor.

In another implementation, the trailer is a three point hitch.

In another implementation, the system includes a pine straw rake elevation adjustment attached to the carrier.

In another implementation, the system includes a cushion wheel connected to the carrier and oriented substantially perpendicular to the wheels.

In another implementation, the system includes a motor.

In yet another aspect, the invention features a rake system, including a plurality of rake bars, each bar having a plurality of rake teeth and means for orienting the rake teeth in a downward motion toward a point on the ground and in a motion within a line along the ground.

In another aspect, the invention features a method of raking pine straw, comprising providing a mechanism capable of orienting rake bars having rake teeth in a geometrical arrangement near a pine tree whereby pine straw close to the base of the pine tree is raked outward from the pine tree.

In still another aspect, the invention features a utility drive system, including two square drives in an offset and substantially parallel orientation with respect to each other, the square drives including a first sprocket, a second sprocket, a third sprocket in a geometric and planar arrangement with the first and second sprockets and a roller chain wrapped around the partial circumferences of the sprockets, and a plurality of cross bars connected to respective points on each of the roller chains.

In an implementation, the system includes brushes connected to the cross bars.

One advantage of the pine straw rake is that it gathers all of the pine straw from the base of trees and outward leaving an insignificant amount of unraked pine straw, typically four inches and less.

Another advantage of the pine straw rake is that the square drive maintains a wider and longer point of contact on the ground to more efficiently gather pine straw. Thus more pine straw is raked both closer to the tree and outward from the tree.

Another advantage of the invention is that it allows elevation adjustments to be made between the pine straw rake and the ground during operation of the pine straw rake systems. In this way an operator of the system does not have to cease the raking operation to make fine adjustments to compensate for uneven ground or other terrain.

One advantage of the drive utility system is that street cleaning brushes can be attached that can utilize the square drive.

Other objects, advantages and capabilities of the invention will become apparent from the following description taken in conjunction with the accompanying drawings showing the preferred embodiment of the invention.

DETAILED DESCRIPTION OF THE INVENTION

Referring to the drawings wherein like reference numerals designate corresponding parts throughout the several figures, the discussion first turns to embodiments of the square drive that is a central feature of the embodiments for the pine straw rake and pine straw rake systems.

Square Drive Embodiments

Figures 2, 3B, 3C:
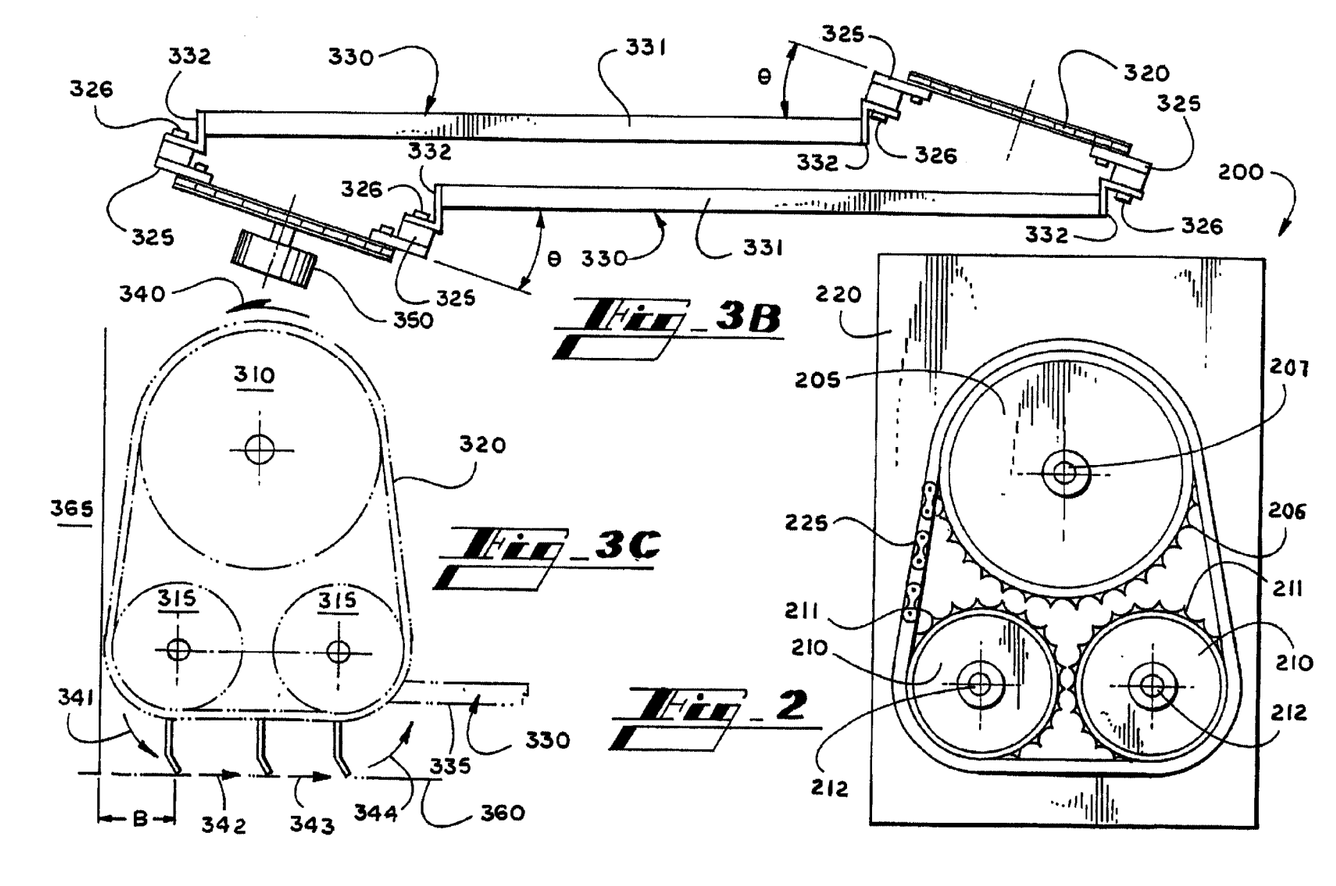
FIG. 2 illustrates an embodiment of a square drive.
FIG. 3B illustrates a top view of an embodiment of the pine straw rake of FIG. 3A.
FIG. 3C illustrates a close up view of one of the square drives of FIGS. 3A–3B.

FIG. 2 illustrates an embodiment of a square drive 200. The square drive 200 includes an upper sprocket 205 having teeth 206 in a triangular arrangement with two lower sprockets 210 having teeth 211. The sprockets 205, 210 are in a planar arrangement and attached on a mounting plate 220. The upper sprocket 205 is connected to the mounting plate 220 at a rotational point 207. Each of the lower sprockets 210 are connected to the mounting plate 220 at similar rotational points 212. The upper sprocket 205 is typically larger then the lower sprockets 210.

A roller chain 225 is wrapped around the sprockets 205, 210 and in engagement with the teeth 206, 211 at the partial circumferences of the sprockets 205, 210.

A motor (not shown, see FIG. 3B, below) is typically attached behind the mounting plate 220 and provides driving power to the square drive 200. Typically, the motor drives the upper sprocket 205.

The term "square drive" is used to described the resultant movement of points along the chain 225 with respect to the unique geometry created by a tree and row of trees growing from the ground (as described below). The square drive 200 is implemented into a pine straw rake system (described below) in order to achieve a more square fitting within the geometry of a tree with respect to the ground.

The actual arrangement of the upper and lower sprockets 205, 210 are arranged in a triangular orientation as shown in FIG. 2 to achieve efficient geometry with respect to a tree and the ground. It is understood that other arrangements can be made to achieve the same efficiency. For example, in another embodiment the upper sprocket 205 can be made larger or smaller. In another embodiment, four similar sized sprockets can replace the upper and lower sprockets 205, 210 described above, and can be arranged in a square configuration. It is understood that the square can be any parallelogram such as a rectangle.

Pine Straw Rake Apparatus and Operation

Pine Straw Rake Apparatus

Figure 3A:
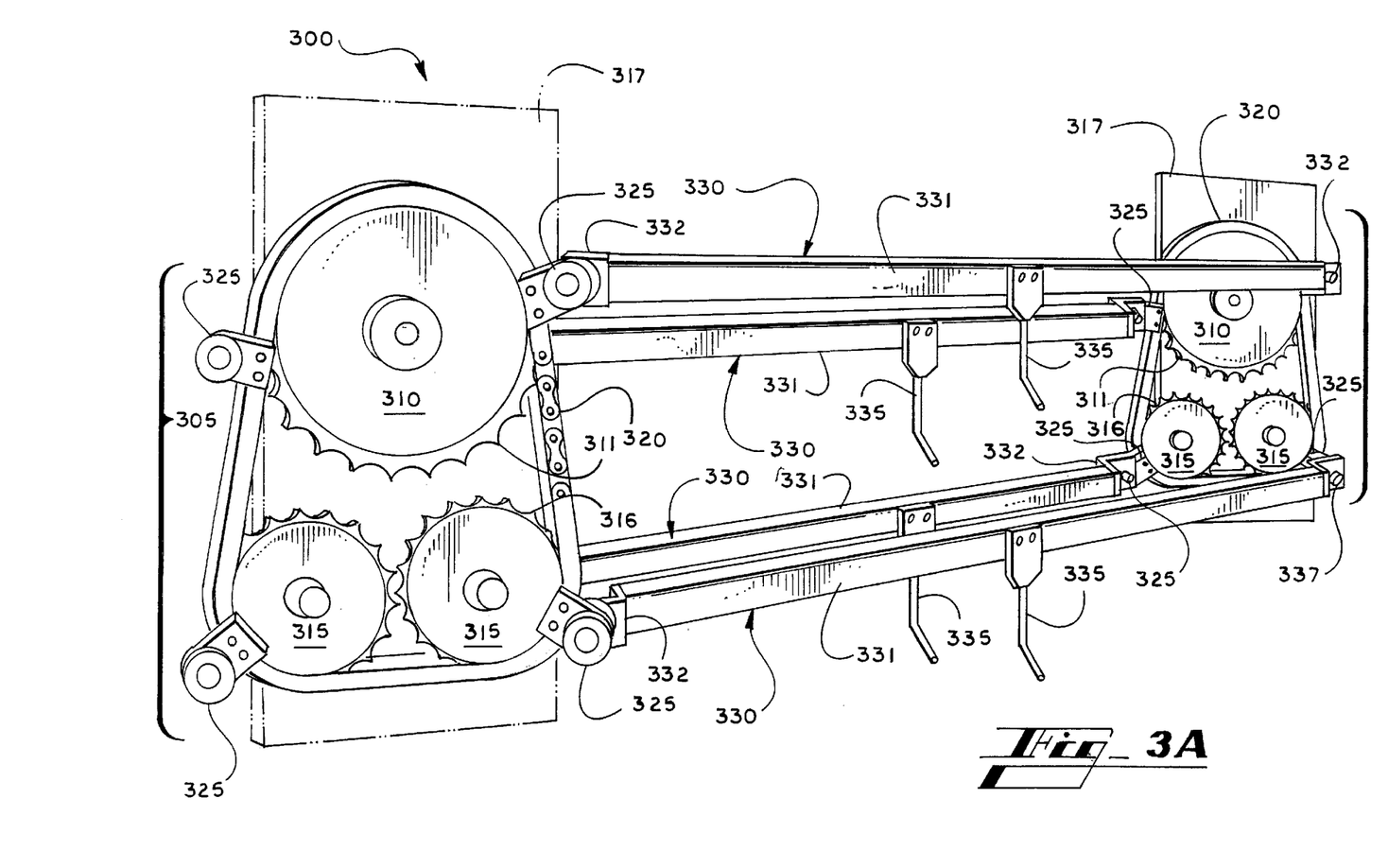
FIG. 3A illustrates a perspective view of an embodiment of a pine straw rake.

An embodiment of a pine straw rake is now discussed in conjunction with FIGS. 3A–3C. FIG. 3A illustrates a perspective view of an embodiment of a pine straw rake 300. FIG. 3B illustrates a top view of the embodiment of the pine straw rake 300 of FIG. 3A. FIG. 3C illustrates a close up view of one of the square drives 305 of FIGS. 3A and 3B.

The pine straw rake 300 includes two square drives 305 as discussed with respect to FIG. 2. Each square drive 305 includes an upper sprocket 310 and two lower sprockets 315. The upper sprocket 305 typically has a larger radius than the lower sprockets 315. A roller chain 320 is wrapped around the sprockets 310, 315, engaged with the teeth 311, 316. The roller chain 320 runs along the partial circumferences of the sprockets 310, 315. As discussed in more detail below, the pine straw rake 300 is attached to a mounting apparatus, such as mounting plate 317 that is connected to a carrier. Other mounting mechanisms can be implemented to attach the pine straw rake 300 to suitable carriers as discussed below.

Chain mounts 325 are connected to the roller chain 320 at substantially evenly spaced intervals along the chain 320. The chain mounts 325 are connected to the roller chain 320 on the outer edge of the roller chain 320 so that they do not interfere with the sprockets 310, 315 as the mounts 325 pass the sprockets 310, 315 during movement.

The pine straw rake 300 further includes rake bars 330. Each end of each of the rake bars 330 are connected to two of the chain mounts 325 on respective points on each of the roller chains 320. The rake bars 330 include an elongated bar 331 and two "L" brackets 332 connected to the elongated bar 331 on opposite ends. The two "L" brackets 332 on each of the rake bars 330 are oriented in opposition. The rake bars 330 are a set length and are rigid. The rake bars 330 are connected to the chain mounts 325 so that the chain mounts 325 can rotate with respect to the rake bars 330, about a connection point 326. The chain mounts 325 have internal bearings and lubrication so that the rotation can be made with little friction.

The rake bars 330 further include rake teeth 335 evenly spaced along the rake bars 330. The rake teeth 335 can vary in number, length and shape.

The orientation of the two square drives 305 is now described.

FIG. 3B illustrates a top view of the pine straw rake 300, showing the orientation of the square drives 305. The two square drives 305 are arranged substantially parallel. As described with respect to FIG. 2, the upper and lower sprockets 310, 315 are arranged in a planar orientation. The respective planes in which the upper and lower sprockets 310, 315 of each of the square drives 305 are oriented, are parallel to each other at a distance. Furthermore, the two square drives 305 are offset from each other at a fixed distance, typically the length of one of the rake bars 330. Therefore, the offset and parallel arrangement of the two square drives 305 result in each of the rake bars 330 being connected to each of the square drives 305 (through the chain mounts 325) at an angle Θ.

Pine Straw Rake Operation

Referring still to FIGS. 3A–3C, the operation of the pine straw rake is now described in further detail.

In the apparatus discussion described above, the square drives 305 are oriented offset and parallel, and each of the rake bars 330 are connected to a respective point on each of the roller chains 320. This offset and parallel arrangement allows the rake bars 325 to revolve about the outer edges of the square drives 305 and overlap with each of the remaining rake bars 330. The square drives 305 are offset and the rake bars 330 are spaced in such a way so that the rake teeth 335 of each of the rake bars 330 clear the rake bar 330 that it is overlapping.

Referring to FIG. 3C, arrows of motion 340, 341, 342, 343, 344 show the typical direction that the roller chains 320 travel. FIG. 3C illustrates a rake bar 300 that has contacted the ground 360. The arrows 340, 341 show how the direction curves around the outer edge of the drive 305. The arrows 342, 343 show how the rake teeth 335 run along the ground 360 for a time it takes the rake bar to run the lower length of the drive 305. The arrow 344 shows the direction that the bar is lifted from the ground at the end of the pass. Recall from FIG. 3B that the rake bar 330 is actually oriented at an angle Θ from the plane in which the sprockets 310, 315 are arranged. Therefore, from the illustration in FIG. 3C, it is understood that the rake bar 330 is oriented to the right and into the paper.

FIG. 3C also illustrates that the unique geometry that the square drive 305 creates with the ground 360 and an obstacle (tree) allows that rake bars 330 to have a more downward motion to the ground and therefore closer to the obstacle than the prior art discussed above. The square drive 305 configuration of the pine straw rake 300 allows the teeth 335 to come substantially downward next to the tree at a much smaller distance, B, as opposed to a distance from the tree (see FIG. 1B where the teeth land at a minimum distance, A). Furthermore, the teeth 335 of each of the rake bars 330 remain in contact with the ground for a time equal to the time it takes the each chain 320 to travel along the lowest portion of the square drives 305. Thus more pine straw is raked both closer to the tree and outward from the tree.

Pine Straw Rake System Embodiments

Figure 4:
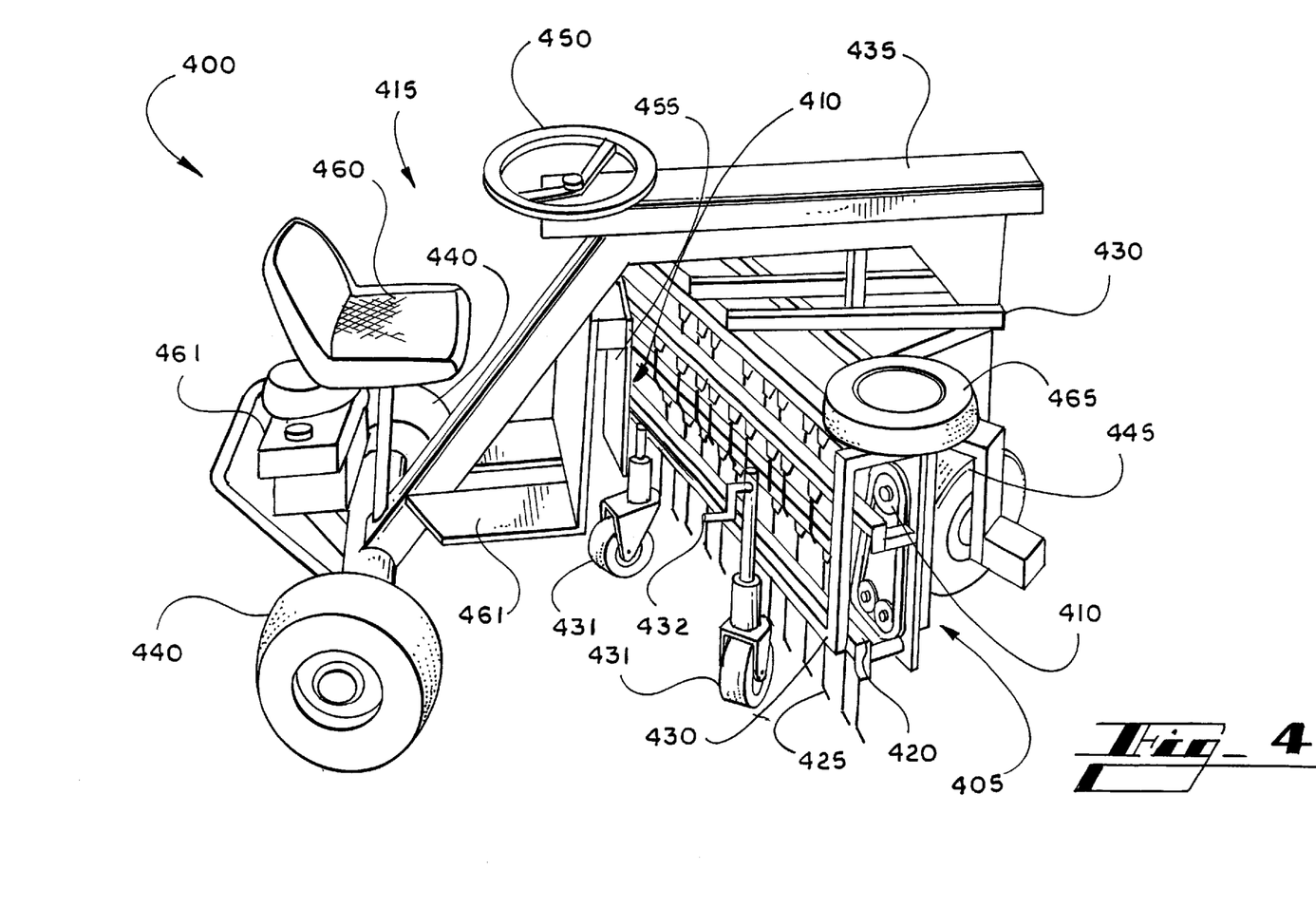
FIG. 4 illustrates an embodiment of a pine straw rake system.

FIG. 4 illustrates an embodiment of a pine straw rake system 400. The system 400 includes a pine straw rake 405 connected to a self propelled carrier 415. The pine straw rake 405 includes two square drives 410, rake bars 420 having teeth 425, and the various connectors as described above with respect to FIGS. 3A–3C. Several mounting bars 430 connect the pine straw rake 405 to the carrier 415. Support wheels 431 are connected to the mounting bars 430 to provide support for the pine straw rake 405. A elevation adjustment 432 is connected to each of the support wheels 431. The elevation adjustment 432 is used to adjust the elevation of either side of the pine straw rake 405 to bring the rake 405 close or farther to the ground. The adjustment is useful in particular for uneven ground next to a tree or obstacle. In such a situation the operator of the system 400 can adjust both sides of the rake 405 to compensate for the differing elevations of uneven ground. In an implementation, the elevation adjustment 432 is a hand crank (as is shown in FIG. 4) that can be easily accessed by the operator during use of the system 400. In other implementations, the elevation adjustment 432 can be hydraulically or electrically controlled or the like. It is understood that several different mechanisms can be used to adjust the elevation.

The carrier 415 includes a body frame 435. Two rear wheels 440 are connected to the frame and coupled to a motor for power. A front wheel 445 is also connected to the frame 435. The front wheel 445 is coupled to a steering wheel 450 for directing the system 400. A motor 455 is connected to the pine straw rake 405 to power the rake 405. The motor 455 can be self powered or be coupled to the motor 441. In an implementation, the motor 455 is hydraulic.

A seat 460 for the system 400 operator and foot rests 461 are also connected to the frame 435. The seat 460 is positioned so that the operator can easily handle and maneuver the system 400. In particular, as the operator is driving and steering the system, the operator can use a free hand to operate the elevation adjustment 432 from the seat 460 without having to cease operation of the system 400. Therefore, the system 400 allows for fine adjustments to the raking action during operation to compensate for uneven ground or other rough terrain.

The system 400 further includes a wheel 465 connected to the mounting bars. The wheel 465 is mounted substantially parallel to the ground. The wheel 465 is typically used to cushion a collision with a tree or other obstacle during operation of the system 400.

It is understood that further controls and attachments necessary to the operation of the system 400 are included in the system and are not shown.

Figure 5:
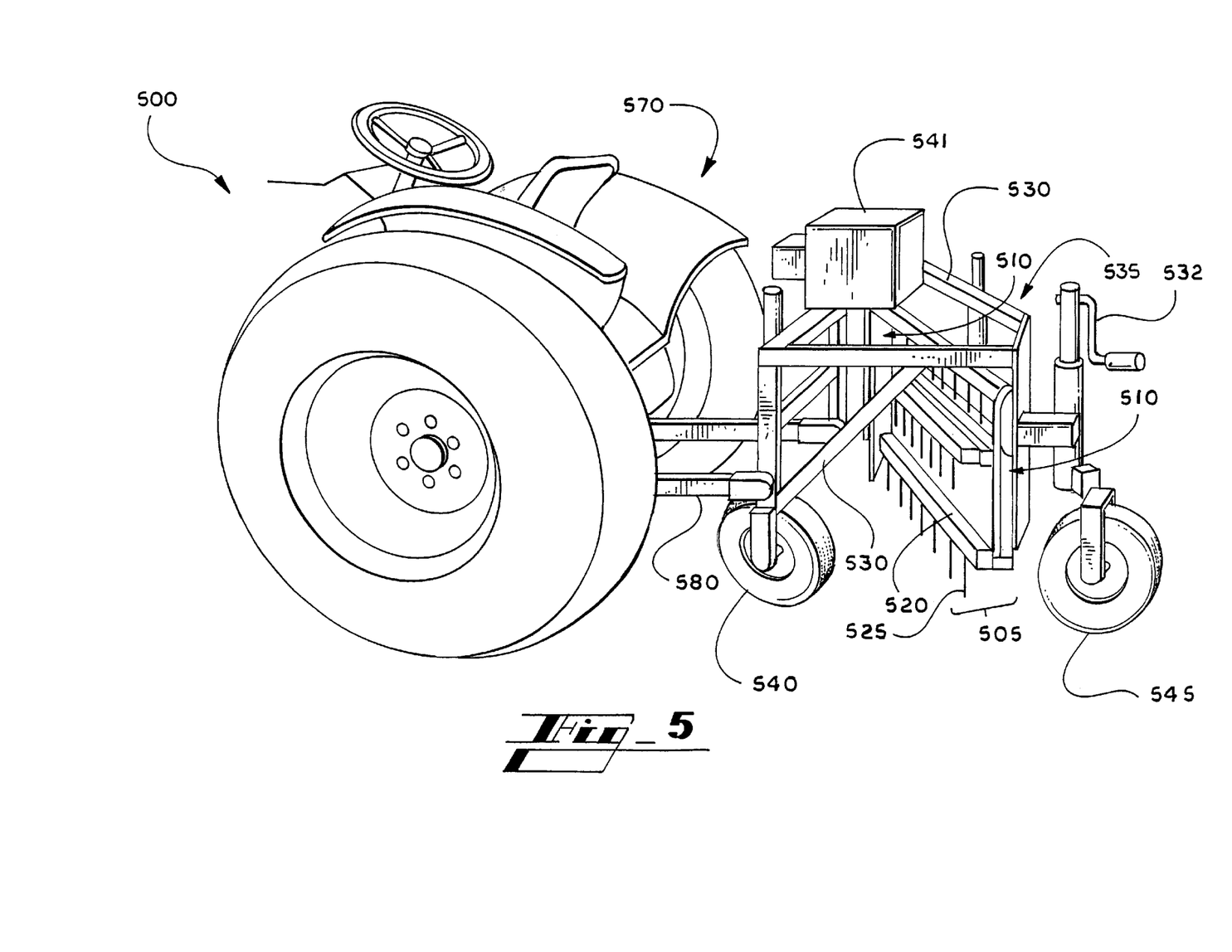
FIG. 5 illustrates another embodiment of a pine straw rake system.

FIG. 5 illustrates another embodiment of a pine straw rake system 500. The system includes a pine straw rake 505 connected to a trailer 535 adapted to be pulled by a tractor 570. The pine straw rake 505 includes two square drives 510, rake bars 520 having teeth 525, and the various connectors as described above with respect to FIGS. 3A–3C. Several mounting bars 530 connect the pine straw rake 505 to the carrier 535. Support wheels 431 are connected to the mounting bars 430 to provide support for the pine straw rake 405. A front wheel 540 is also connected to the carrier 535. A rear wheel 545 is also connected to the carrier 535. A motor 541 is connected to the pine straw rake 505 to power the rake 505. In another embodiment, the pine straw rake 505 can be powered by being connected to the standard 540 power take-off from the tractor 570. In an implementation, the motor 541 is hydraulic.

An elevation adjustment 532 is connected to the rear wheel 545. An additional elevation adjustment can be connected to other wheels on the system 500. The elevation adjustment 532 is used to adjust the elevation of either side of the pine straw rake 505 to bring the rake 505 close or farther to the ground. The adjustment 532 is useful in particular for uneven ground next to a tree or obstacle. In such a situation the operator of the system 500 can adjust both sides of the rake 505 to compensate for the differing elevations of uneven ground. In an implementation, the elevation adjustment 532 is a hand crank (as shown in FIG. 5) that can be easily accessed by the operator during use of the system 500. In other implementations, the elevation adjustment 532 can be hydraulically or electrically controlled or the like. It is understood that several different mechanisms can be used to adjust the elevation.

The system 500 can further include a wheel (not shown) connected to the mounting bars 530, similar to the wheel shown in FIG. 4 (wheel 465). The wheel can be mounted substantially parallel to the ground. The wheel is typically used to cushion a collision with a tree or other obstacle during operation of the system 500.

In one embodiment, the trailer is a three point hitch of a conventional farm tractor.

It is understood that the pine straw rake can be connected to any other type of trailer that can be pulled by a variety of other vehicles other than tractors.

It is understood that further controls and attachments necessary to the operation of the system 500 are included in the system and are not shown.

In either of the systems described above or in any other implementations or embodiments of the pine straw rake apparatus and systems described above, the square drives are typically oriented perpendicular to the row of trees that supplied the straw. In such an orientation, the rake bars are typically oriented at an angle ⊖, rearward, with respect to the square drives as described above. This orientation allows the pine straw to be shifted from the trees to the opposite side of the pine straw rake systems.

Figure 6:
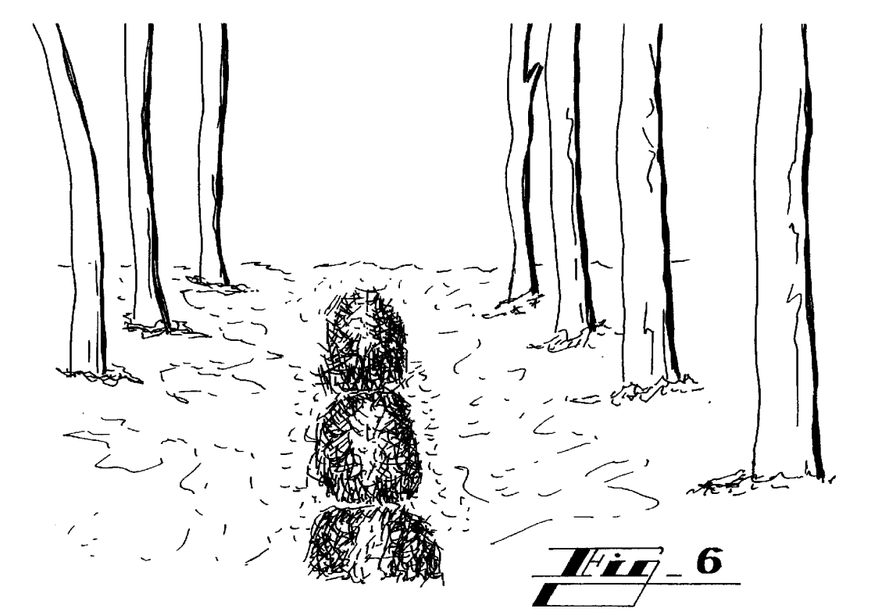
FIG. 6 illustrates an embodiment of a pine straw rake system gathering pine straw.

FIG. 6 illustrates an embodiment of a pine straw rake system gathering pine straw. The pine straw is gathered at a section in the middle of the rows of trees. In contrast to FIG. 1C, FIG. 6 illustrates that the pine straw has been raked from the base of the trees much closer than that of the prior art hay rake f FIG. 1C.

The embodiments described above have been specifically described for use with pine straw. However, it has been determined that the use of the square drive can also be used with hay rakes. The advantage of the square drive, leaving a wider and longer point of contact with the ground can benefit hay rakes. For example, hay fields having fences, mounds, uneven ground and other barriers, can use the square drive pine straw rake to get close to these barriers and rake up hay otherwise not accessible with circular hay rakes. Therefore, it is understood that the pine straw rake and square drive can be modified and used in the hay industry as well as the pine straw industry.

It is further understood that the square drive can be used in other systems to create a general purpose utility system. Any type of utility system that can take advantage of the unique geometry of the square drive can be implemented. For example, the rake bars of the pine straw rake can be replaced with street cleaning brushes. This utility system can be connected to any carrier that can in turn clean streets efficiently and close to curbs and other obstacles.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A pine straw rake for raking pine straw from the base of an obstacle, comprising:
    two square drives in an offset and parallel orientation with respect to each other, the square drives including:
        a first sprocket;
        a second sprocket;
        a third sprocket in a geometric and planar arrangement with the first and second sprockets; and
        a roller chain wrapped around the partial circumferences of the sprockets, wherein the square drives are angled with respect to a forward direction of the pine straw rake, so that the square drives are in a non-parallel orientation with the forward direction;
    a plurality of rake bars connected to respective points on each of the roller chains, wherein the rake bars are connected to each of the square drives at an angle of less than ninety degrees; and
    a plurality of rake teeth connected to each of the rake bars, wherein the rake bars are adapted to move around the outer edge of the drives so that the rake teeth can move downward in close proximity of the obstacle along a lower edge of the square drives so that the rake teeth can move the pine straw from the obstacle, in a direction non-parallel to the forward direction.

2. The pine straw rake as claimed in claim 1, further comprising chain mounts connected to the roller chains and rotatably connected to respective ends of the rake bars, so that the rake bars can rotate about the chains mounts with respect to the roller chains.

3. The pine straw rake as claimed in claim 1, wherein the rake bars are adapted to overlap each other while in motion.

4. The pine straw rake as claimed in claim 1, wherein the square drives are adapted to direct the rake teeth in a motion toward the ground and in a motion along the ground during a cycle of movement of the square drives.

5. A pine straw rake system for raking pine straw from the base of an obstacle, comprising:
 a carrier having wheels, the carrier being adapted to move in a forward direction;
 a pine straw rake connected to the carrier, the pine straw rake comprising two square drives in an offset and parallel orientation with respect to each other, the square drives including, including:
  a first sprocket;
  a second sprocket;
  a third sprocket in a geometric and planar arrangement with the first and second sprockets; and
  a roller chain wrapped around the partial circumferences of the sprockets, wherein the square drives are angled with respect to the forward direction of the pine straw rake, so that the square drives are in a non-parallel orientation with the forward direction; and
 a plurality of rake bars connected to respective points on each of the roller chains, wherein the rake bars are connected to each of the square drives at an angle of less than ninety degrees; and
 a plurality of rake teeth connected to each of the rake bars, wherein the rake bars are adapted to move around the outer edge of the drives so that the rake teeth can move downward in close proximity of the obstacle along a lower edge of the square drives so that the rake teeth can move the pine straw from the obstacle, in a direction non-parallel to the forward direction.

6. The system as claimed in claim 5, wherein the carrier is self-propelled.

7. The system as claimed in claim 5, wherein the carrier is a trailer adapted to be pulled by a primary mover.

8. The system as claimed in claim 7, wherein the primary mover is a tractor.

9. The system as claimed in claim 7, wherein the trailer is a three point hitch.

10. The system as claimed in claim 5, further, comprising a pine straw rake elevation adjustment attached to the carrier.

11. The system as claimed in claim 5, further comprising a cushion wheel connected to the carrier and oriented substantially perpendicular to the wheels.

12. The system as claimed in claim 5, further comprising a motor connected to the pine straw rake.

13. A utility drive system, comprising:
 two square drives in an offset and substantially parallel orientation with respect to each other, the square drives including:
  a first sprocket;
  a second sprocket;
  a third sprocket in a geometric and planar arrangement with the first and second sprockets; and
  a roller chain wrapped around the partial circumferences of the sprockets, wherein the square drives are angled with respect to a forward direction of the pine straw rake, so that the square drives are in a non-parallel orientation with the forward direction; and
 a plurality of cross bars connected to respective points on each of the roller chains wherein the cross bars are connected to each of the square drives at an angle less than ninety degrees and are adapted to move around the outer edge of the drives so that the cross bars can move downward in close proximity to an obstacle along a lower edge of the square drives, the cross bars moving in a direction that is non-parallel to the forward direction.

14. The system as claimed in claim 13 further comprising brushes connected to the cross bars.

15. The system as claimed in claim 13 further comprising rake teeth connected to the cross bars.

* * * * *